United States Patent [19]

Rathunde

[11] Patent Number: 5,598,549
[45] Date of Patent: Jan. 28, 1997

[54] ARRAY STORAGE SYSTEM FOR RETURNING AN I/O COMPLETE SIGNAL TO A VIRTUAL I/O DAEMON THAT IS SEPARATED FROM SOFTWARE ARRAY DRIVER AND PHYSICAL DEVICE DRIVER

[75] Inventor: Dale F. Rathunde, Wheaton, Ill.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 76,652

[22] Filed: Jun. 11, 1993

[51] Int. Cl.$^6$ ........................................ G06F 7/22
[52] U.S. Cl. ............... 395/441; 395/182.04; 395/404; 364/236.2; 364/238.2
[58] Field of Search ........................ 395/275, 725, 395/425, 182.04, 404, 441; 364/236.2, 238.3

[56] References Cited

U.S. PATENT DOCUMENTS

| | | | |
|---|---|---|---|
| 4,084,230 | 4/1978 | Matick | 364/200 |
| 4,627,018 | 12/1986 | Trost et al. | 364/900 |
| 5,124,987 | 6/1992 | Milligan et al. | 371/10.1 |
| 5,179,666 | 1/1993 | Rimmer et al. | 395/275 |
| 5,301,297 | 4/1994 | Menon et al. | 395/425 |
| 5,301,310 | 4/1994 | Isman et al. | 395/575 |
| 5,333,277 | 6/1994 | Searls | 395/325 |
| 5,345,565 | 9/1994 | Jibbe et al. | 395/325 |
| 5,396,603 | 3/1995 | Tamaki et al. | 395/375 |
| 5,408,644 | 4/1995 | Schneider et al. | 395/575 |
| 5,410,667 | 5/1995 | Belsan et al. | 395/425 |
| 5,418,925 | 5/1995 | DeMoss et al. | 395/425 |
| 5,440,716 | 8/1995 | Schultz et al. | 395/441 |

*Primary Examiner*—Thomas C. Lee
*Assistant Examiner*—Anderson I. Chen
*Attorney, Agent, or Firm*—David F. Zinger; James M. Stover

[57] ABSTRACT

A scalable software architecture, for optimal performance on a RAID level 1, 3, 4 and 5 disk array or tape array. The software architecture consists of a software device driver and one or more driver daemon processes to control I/O requests to the arrays. Implemented in a UNIX or NetWare operating environment, this architecture provides a transparent interface to the kernels I/O subsystem, physical device drivers and system applications. The array driver and I/O daemon can be run on a uni-processor or multi-processor system platform to optimize job control, error recovery, data recreation, parity generation and asynchronous writes.

22 Claims, 6 Drawing Sheets

ARRAY STORAGE SYSTEM FOR RETURNING AN I/O COMPLETE SIGNAL TO A VIRTUAL I/O DAEMON THAT IS SEPARATED FROM SOFTWARE ARRAY DRIVER AND PHYSICAL DEVICE DRIVER

The present invention relates to disk array storage systems and, more particularly, to a scalable architecture for optimal performance on RAID (Redundant Array of Inexpensive Disks) level 1, 3, 4 and 5 disk array and tape array storage systems.

BACKGROUND OF THE INVENTION

RAID (Redundant Array of Inexpensive Disks) storage systems have emerged as an alternative to large, expensive disk drives for use within present and future computer system architectures. A RAID storage system includes an array of small, inexpensive hard disk drives, such as the 5¼ or 3½ inch disk drives currently used in personal computers and workstations. Although disk array products have been available for several years, significant improvements in the reliability and performance of small disk drives and a decline in the cost of such drives have resulted in the recent enhanced interest in RAID systems.

Current disk array design alternatives are described in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks. Five disk array arrangements, referred to as RAID levels, are described. The simplest array, a RAID level 1 system, comprises one or more disks for storing data and an equal number of additional "mirror" disks for storing copies of the information written to the data disks. The remaining RAID levels, identified as RAID level 2, 3, 4 and 5 systems, segment the data into portions for storage across several data disks. One or more additional disks are utilized to store error check or parity information. The present invention is directed primarily to improvements in the operation of RAID levels 1, 4 and 5 systems. RAID level 3 systems may also benefit from application of the present invention.

A RAID level 4 disk array is comprised of N+1 disks wherein N disks are used to store data, and the additional disk is utilized to store parity information. Data to be saved is divided into portions consisting of one or many blocks of data for storage among the disks. The corresponding parity information, which can be calculated by performing a bit-wise exclusive-OR of corresponding portions of the data stored across the N data drives, is written to the dedicated parity disk. The parity disk is used to reconstruct information in the event of a disk failure. Writes typically require access to two disks, i.e., one of the N data disks and the parity disk, as will be discussed in greater detail below. Read operations typically need only access a single one of the N data disks, unless the data to be read exceeds the block length stored on each disk.

RAID level 5 disk arrays are similar to RAID level 4 systems except that parity information, in addition to the data, is distributed across the N+1 disks in each group. Each one of the N+1 disks within the array includes some blocks for storing data and some blocks for storing parity information. Where parity information is stored is controlled by an algorithm implemented by the user. As in RAID level 4 systems, RAID level 5 writes typically require access to two disks; however, no longer does every write to the array require access to the same dedicated parity disk, as in RAID level 4 systems. This feature provides the opportunity to perform concurrent write operations.

A RAID level 5 system including five disk drives, DRIVE 1 through DRIVE 5, is illustrated in FIG. 1. Five data groups, identified as Data Group 0 through Data Group 4, are shown, each data group providing for the storage of four data blocks and one parity block. Data blocks, numbered 0 through 19, are identified by reference numeral 103. Parity blocks are identified by reference numeral 107.

Although the discussion presented above, including the references incorporated by reference, refer to arrays of disk drives, arrays may also be constructed of storage units other than disk drives, such as tape drives. A RAID level 4 system including five tape drives, DRIVE 1 through DRIVE 5, is illustrated in FIG. 2. As in FIG. 1, five data groups, identified as Data Group 0 through Data Group 4, are shown, each data group providing for the storage of four data blocks and one parity block. Data blocks, numbered 0 through 19, are identified by reference numeral 103. Parity blocks are identified by reference numeral 107. In contrast to the system shown in FIG. 1, it will be noticed that parity blocks 107 all reside on tape drive Drive 5.

In order to coordinate the operation of the multitude of disk or tape drives within an array to perform read and write functions, parity generation and checking, and data restoration and reconstruction, complex storage management techniques are required. Array operation can be managed through software routines executed by the host computer system, i.e., a software array architecture, or by a dedicated hardware controller constructed to control array operations.

A hardware array improves storage reliability and availability, improves system performance without modifying user applications and provides storage capacities larger than any single device. A software array architecture can deliver this functionality at a lower cost of implementation, and offer more storage management and configuration flexibility.

A software architecture allows existing storage to be used in the most efficient manner. All RAID levels can be configured at the same time, as well as multiple instances of any one RAID level. RAID levels can be configured on a subdisk basis (partition) which allows the configuration of multiple RAID levels on a single physical disk. Some RAID levels can also be nested to provide the highest level of performance and reliability possible (e.g., striped mirror). The increasing speed and power of host computer systems provides performance that is competitive with many hardware array products.

Additional improvements to disk array systems are desired to better utilize the speed and power of current and next generation computer systems, particularly multiple processor computer systems.

OBJECTS OF THE INVENTION

It is therefore an object of the present invention to provide a new and useful array storage system architecture.

It is another object of the present invention to provide such an array storage system architecture which is scalable for use within uni-processor and multi-processor computer systems.

It is yet another object of the present invention to provide such an array storage system architecture the operation of which can be distributed among processors within a multiple processor computer system to process the various steps within one or more I/O operations in parallel.

SUMMARY OF THE INVENTION

There is provided, in accordance with the present invention, a disk or tape array storage system for use in a data processing system. the array storage system includes a plurality of disk or tape drives and corresponding physical device drivers, a physical device driver corresponding to each disk within the array. Three software modules are employed to coordinate the I/O operation-of the array: a software array driver, one or more virtual I/O daemons, and a call-back routine. The software array driver module receives a system I/O request from the host processing system and translates the system I/O request into virtual I/O requests which are provided to one or more of the physical device drivers. Each physical device driver receiving a virtual I/O request operates to translate the received virtual I/O request into a physical I/O request which is provided to the drive corresponding to the physical device drivers. The call-back module receives physical I/O complete signals from the plurality of drives and translates the physical I/O complete signals into one or more virtual I/O complete signals corresponding to the virtual I/O requests generated by the software array driver. The virtual I/O daemon module receives the virtual I/O complete signals from the call-back module and translates the received virtual I/O complete signals into a system I/O complete signal which is provided back to the host system.

In the described embodiment, the present invention is implemented within a UNIX multiple processor computer system. The array system includes a tunable number of virtual I/O daemons depending on the number of CPUs supported on the multiprocessor computer system, the virtual I/O daemons processing virtual jobs in parallel.

The above and other objects, features, and advantages of the present invention will become apparent from the following description and the attached drawings.

DETAILED DESCRIPTION OF THE PREFERRED EMBODIMENT

Design Overview

Figure 1:
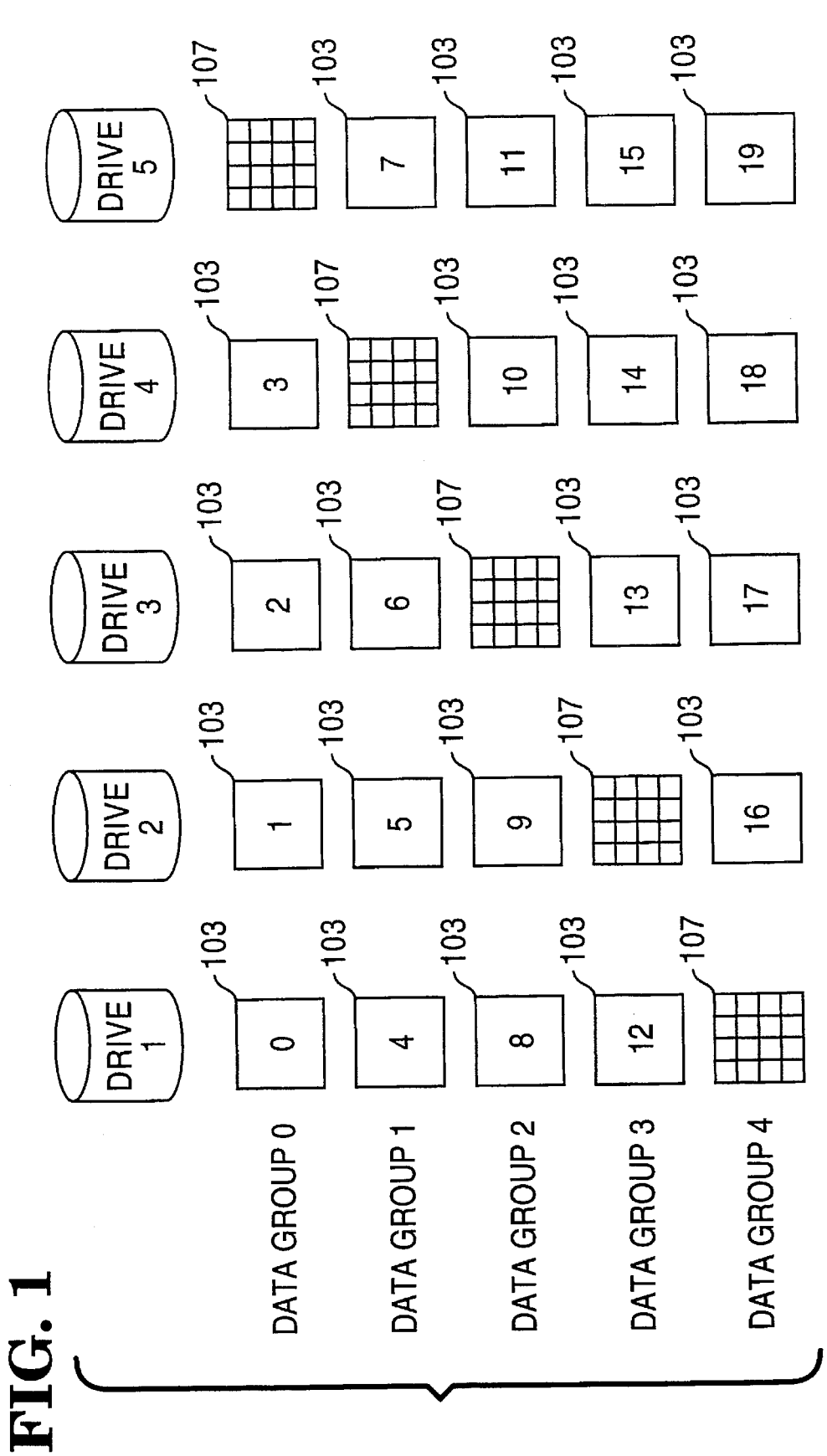
FIG. 1 illustrates the manner in which data and parity information is distributed among disk drives within a RAID level 5 disk array.
Figure 2:
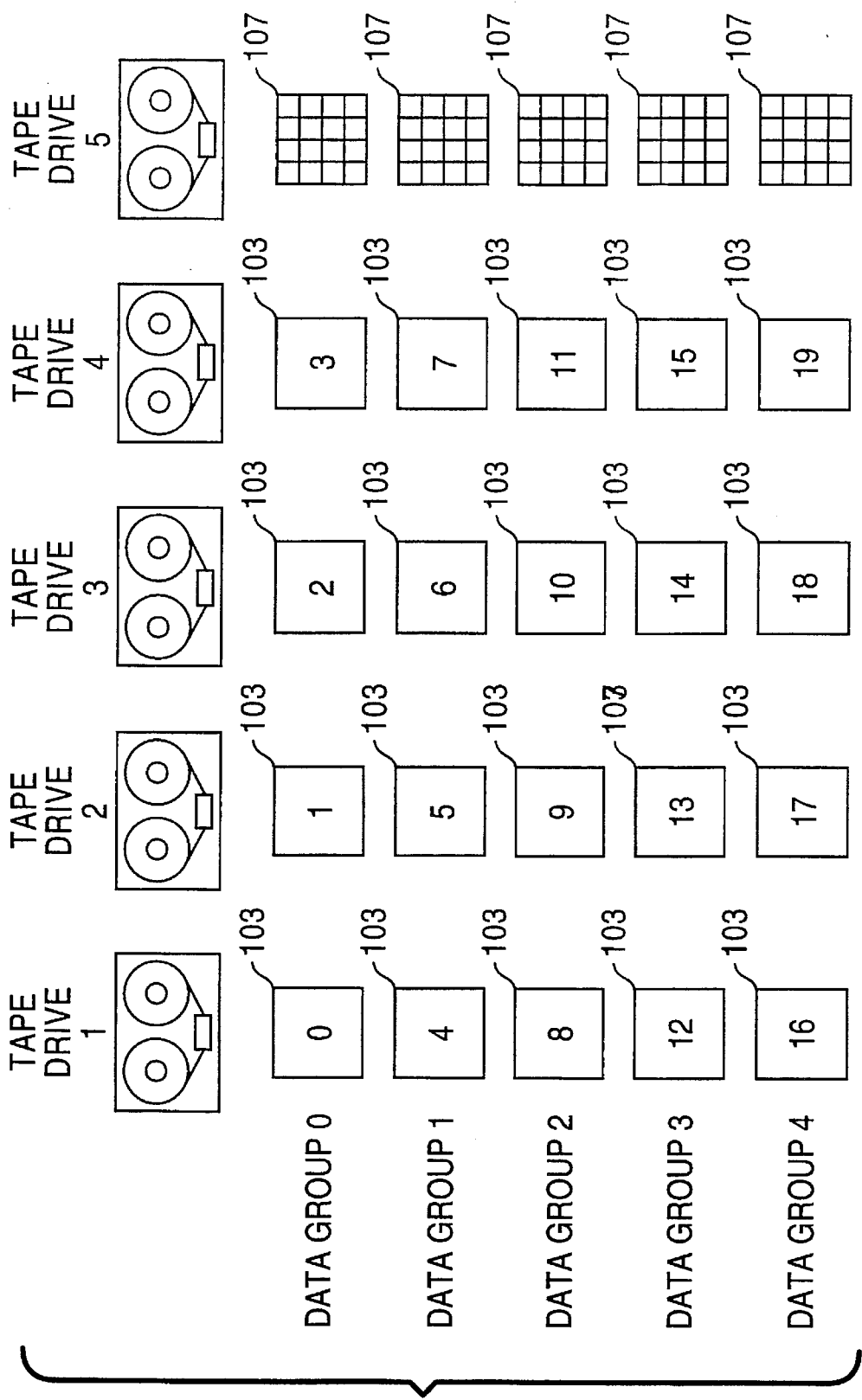
FIG. 2 illustrates the manner in which data and parity information is distributed among tape drives within an array organized in accordance with RAID level 4.
Figure 3:
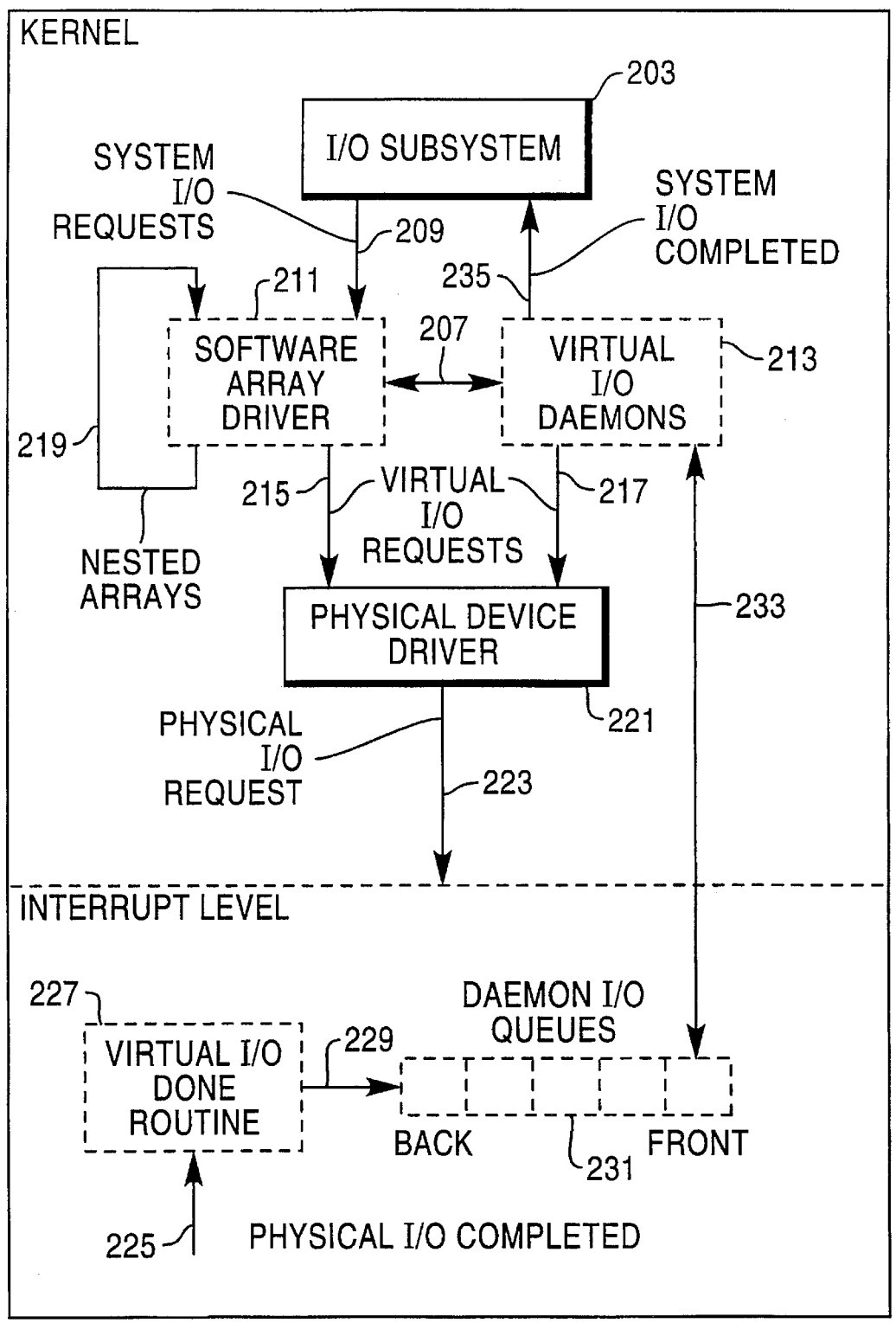
FIG. 3 is a block diagram illustration a software disk array architecture in accordance with the preferred embodiment of the present invention.

An overview of the architecture of the preferred embodiment of the present invention is provided in the block diagram of FIG. 3. The architecture includes three software modules referred to as software array driver 211, virtual I/O daemons 213 and virtual I/O done routine 227. Software array driver 211 receives a system I/O request 209, evaluates the state of the disk array configuration and translates system I/O request 209 into a virtual I/O operation. A system I/O request can be passed by the kernel I/O subsystem 203 or the array software itself to perform an on-line restore, verify or reconfiguration operation. For optimal performance and reliability this software architecture supports three types of virtual I/O operations: single disk (or cluster), full stripe (or group) and partial stripe. Single cluster read and write accesses are supported for random I/O operations on RAID level 4 and 5 arrays. Full stripe read and writes are provided for RAID level 3 performance on RAID level 1, 4 and 5 disk and tape arrays and to optimize backup/restore, on-line restore, verify and reconfiguration operations. And last, partial stripe read and writes are provided for application compatibility on RAID levels 4 and 5.

A virtual I/O operation can consist of one or more virtual I/O requests 215 and 217 to assure data integrity on an array. The virtual I/O request can be either synchronous or asynchronous, wherein mirror data write (RAID level 1) or parity write operations (RAID levels 4 and 5) are separated for execution, and may specify a different starting logical block number, block size or I/O direction (read/write) than the system I/O request. The kernel physical device driver 221 (e.g., hard disk driver) translates a virtual I/O request into a physical I/O request 223. At interrupt level when a physical I/O request 225 completes, the kernel call back mechanism is used to call virtual I/O done routine 227. This routine places the completed virtual I/O request on one of the daemon I/O queues 231 and notifies the daemon 213. The optimal queue is selected based on each daemon's outstanding work load.

The I/O daemons 213 operate in the background to determine if any error recovery, data recreation or parity generation is required based on the virtual I/O operation and the state of the array configuration. The I/O daemons 213 may reissue virtual I/O requests 217 as part of the virtual I/O operation (e.g.. read-modify-write) or if error recovery (e.g., read parity data) is needed. Once the daemons have completed processing the virtual I/O operation, the original system I/O request is completed (returned to the kernel).

To assure data integrity, virtual I/O operations are performed on designated boundaries (i.e., cluster or stripewidth). These boundaries are defined by the array configuration. This architecture uses a hashing implementation based on cluster boundaries to control access to data and parity blocks on the drives during all virtual I/O operations (including error recovery).

For optimal performance on a multi-processor platform, this software architecture allows for one or more virtual I/O operations to be processed by the array driver 211, daemons 213 or call back routine simultaneously on multiple CPUs. On this platform, the number of I/O daemons can be scaled to the number of processors in the system to maximize parallelism. This architecture also allows virtual I/O operations to be processed during physical I/O transfers which optimizes performance on both uni-processor and multi-processor platforms.

Base-Level Software Array Driver

Figure 4:
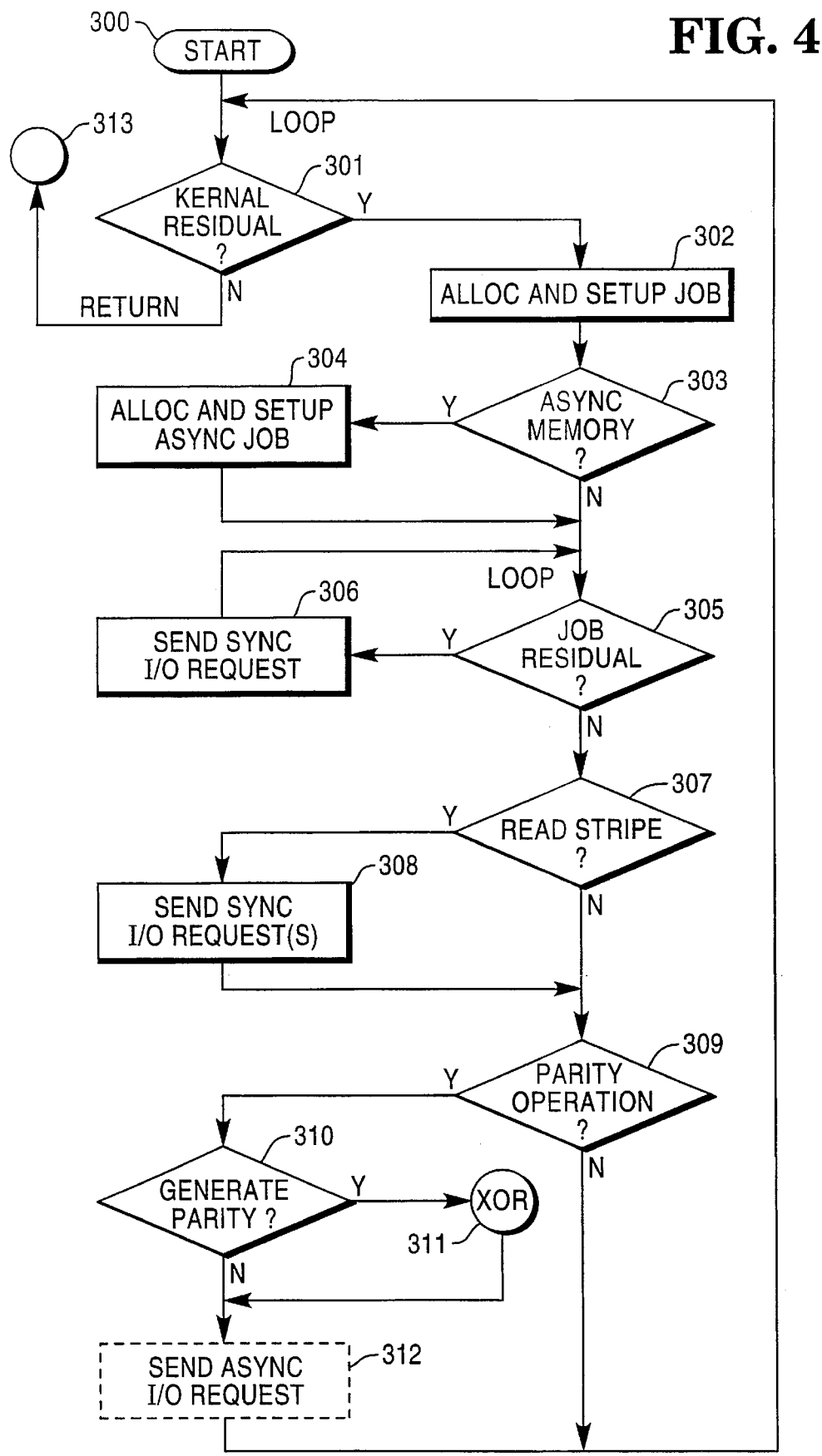
FIG. 4 is a flow chart illustrating the software array driver routine in accordance with the preferred embodiment of the present invention.
Figure 5:
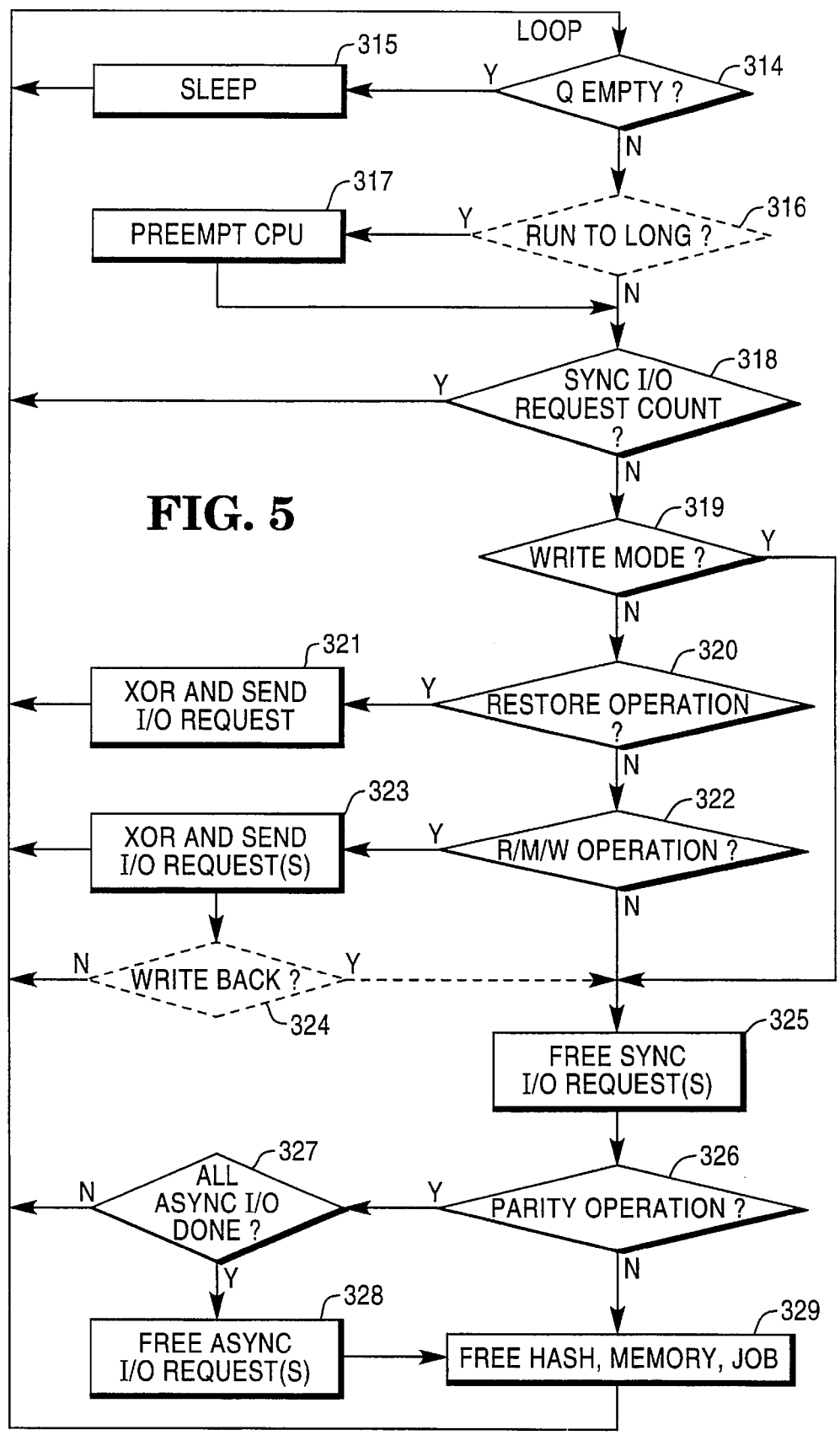
FIG. 5 is a flow chart illustrating the daemon I/O request routine in accordance with the preferred embodiment of the present invention.

The software architecture for the software array driver is shown in FIG. 4. The major components of this architecture have been numbered in FIG. 4 and are described below. A description of various I/O operations with reference to the flow charts provided in FIGS. 3, 4 and 5 is provided in the Implementation section below.

300: A system I/O request is received from the kernel, I/O daemon or one of the array driver on-line operation routines.

301: One or more virtual I/O operations will be issued until the residual byte count of the system I/O request is zero.

302: A virtual job structure from the array driver's job pool is allocated and setup to track a virtual I/O operation. The virtual I/O request size is truncated (if needed) to fit into the current stripe-width. The state of the array configuration and the system I/O request are evaluated to determine the mode of operation in a virtual job structure (e.g., partial read, full write, etc.). A synchronous I/O request count is stored in the virtual job structure for the I/O daemon (see FIG. 5).

303: Additional memory is needed if the mode of operation involves parity, a read-modify-write, or an out-of-service drive operation (requiring data recreation)

304: Kernel memory is allocated and assigned to the virtual job structure. The size of the memory required is based on the specific virtual I/O operation. To optimize the use of kernel virtual memory the driver needs only to allocate a cluster size of additional memory for full writes including parity and read-modify-writes to a single drive. All other virtual I/O operations will require up to the size of the stripe-width (or data group) in the array configuration. This kernel memory allows the architecture to support asynchronous parity writes for RAID levels 1, 4 and 5.

305: One or more synchronous virtual I/O requests will be issued until the residual byte count of the job structure is zero.

Note: The I/O daemon will not start processing the virtual job until all synchronous virtual I/O requests have completed. The daemon does not wait for asynchronous virtual I/O requests.

306: A virtual I/O request will access data on one drive in the array (up to one cluster size). A hash table entry is calculated for the cluster associated with the I/O request. If the hash table entry for this I/O request is busy, the driver will wait (sleep) until the entry is freed by the completion of another virtual I/O request through the I/O daemon. The hash table entry is then propagated and retained until the virtual I/O operation is completed by the I/O daemon. If the drive associated with the I/O request is out-of-service, the I/O request structure is initialized (e.g., memory address) and passed directly to the I/O daemon. Otherwise, the I/O request is issued to the underlying device driver.

307: All clusters in the stripe-width must be read if this is a partial virtual job or a virtual I/O request to an out-of-service drive in the array.

308: One or more synchronous virtual I/O requests will be issued to read the remaining clusters in the stripe-width. These I/O requests also use the hashing method to insure data integrity.

309: If this virtual job allocated kernel memory, a parity I/O request must be included in this virtual I/O operation.

310: Parity data is generated for a virtual I/O operation writing a full stripe if parity is not out-of-date.

311: An exclusive-or operation is performed on the data passed by the kernel and placed in the additional kernel memory allocated for the virtual job.

312: The parity virtual I/O request is hashed to insure data integrity. If the drive associated with this I/O request is out-of-service, the virtual I/O request is passed directly to the I/O daemon. An asynchronous tunable allows the driver to issue a asynchronous virtual I/O request to write the parity drive in the stripe. Writing parity in asynchronous mode will not inhibit the completion of the system I/O request. If parity is being read, a synchronous I/O request is issued.

313: Return to the caller who issued the system I/O request.

Virtual I/O Daemon

Figure 6:
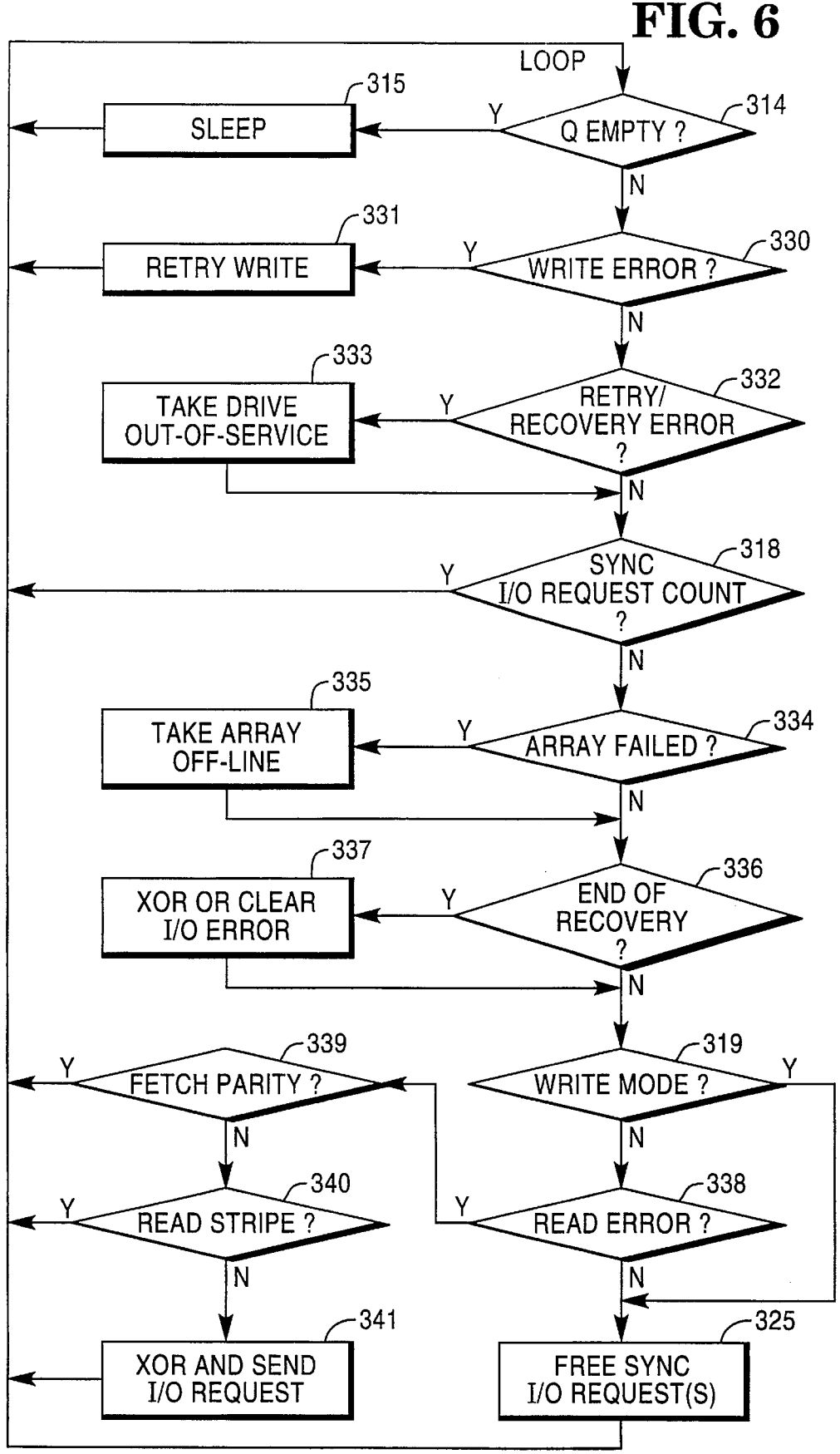
FIG. 6 is a flow chart illustrating the daemon I/O error recovery routine in accordance with the preferred embodiment of the present invention.

The software architecture for the Virtual I/O Daemon has been divided into two parts: the I/O request procedure shown in FIG. 5 and the error recovery procedure shown in FIG. 6. The reference numbers associated with the major components of the I/O daemon are unique except where the same component is shown in both flow charts.

The following describes the components of the Daemon I/O Request procedure shown in FIG. 5:

314: The virtual I/O daemon will evaluate its respective queue to determine if there is a virtual I/O request to be processed.

315: Operation is suspended until the virtual I/O done routine puts the next virtual I/O request on the daemon's queue. Note: All virtual I/O requests associated with the same virtual job go to the same daemon queue.

316: A preempt tunable allows the I/O daemon to processes a specified number of virtual I/O requests continuously (without sleeping) before giving up the CPU.

317: Control of the CPU is relinquished until the kernel schedules the daemon to run again.

318: The daemon can start to process the virtual job following completion of all synchronous virtual I/O requests.

319: The virtual job specifies a write mode of operation. A virtual job is in write mode when the pending virtual I/O requests are writing data to the array (e.g., full write, the tail end of a read-modify-write or restore operation).

320: The virtual job specifies a read mode and restore virtual I/O operation.

321: An exclusive-or operation is performed on the data read in the stripe to recreate data for an out-of-service drive or generate new parity data. A virtual I/O request is issued to the appropriate drive.

322: The virtual job specifies a read-modify-write mode of operation. This can be either a partial or cluster virtual I/O operation.

323: An exclusive-or operation is performed to extract the original data from the current parity data. One or more virtual I/O requests are then issued to write the new data to the array. If parity is in-service, another exclusive-or operation is performed to generate new parity data. An asynchronous, or delayed, virtual I/O request is issued to write the parity drive.

324: A write-back tunable allows the driver to complete the system I/O request to the kernel without waiting for the completion of the remaining virtual I/O requests. In this mode, the remaining virtual I/O requests are handled asynchronously.

325: All synchronous virtual I/O requests are completed. This will complete the system I/O request to the kernel.

326: The virtual job specifies the virtual I/O operation includes parity.

327: The process waits until all asynchronous virtual I/O requests have completed before completing requests and freeing resources.

328: All asynchronous virtual I/O requests are completed.

329: Hash table entries for all virtual I/O requests are freed. Any virtual I/O requests waiting for hash table entry are awoken. Kernel virtual memory is freed if allocated for parity operation. Virtual job structure is returned to the driver's job pool.

Daemon Error Recovery

The following describes the components of the Daemon Error Recovery procedure shown in FIG. 6:

330: I/O operations are examined to determine if a virtual I/O request failed to write for the first time to a drive in the array.

331: The virtual I/O request is resent. This will correct a medium error on a system with automatic bad block handling.

332: I/O operations are examined to determine if the virtual job failed to complete a write retry I/O request, a read error recovery attempt using parity, or a read failed and parity is out-of-date. Also, If one drive goes out-of-service during a read recovery operation or the array goes off-line all subsequent virtual I/O request errors will take a drive out-of-service.

333: The failed drive is taken out-of-service. Timestamps on the operating drives in the array are updated.

334: Array status is checked to determine if more than one drive is out-of-service in the array or one drive is out-of-service and parity is out-of-date.

335: The array is placed off-line. Timestamps on the operating drives in the array are updated.

336: Error recovery is finished if a drive was out-of-service at the start of a virtual I/O operation or a drive was taken out-of-service during the virtual I/O operation.

337: An exclusive-or operation is performed to recreate the data for the out-of-service drive. The I/O error is cleared so the system I/O request is successful.

338: I/O operations are examined to determine if a virtual I/O request failed and the virtual job specifies a read mode of operation. A virtual I/O request is in read mode when the pending virtual I/O requests are reading data from the array (e.g., full read, front end of a read-modify-write operation).

339: If the virtual job does not specify a parity operation then additional kernel memory is allocated and a synchronous virtual I/O request is issued to read the parity data. This I/O request uses the hashing method to insure data integrity.

340: One or more synchronous virtual I/O requests are issued to read the array if the virtual job does not include all data for the stripe. These I/O requests use the hashing method to insure data integrity.

341: An exclusive-or operation is performed to recreate the data for the failed drive. A synchronous virtual I/O request is issued to attempt to re-write the data on the failed drive. This will correct a medium error on a system with automatic bad block handling.

Although performance is very important, an array implementation must sustain a single drive failure, medium defects, system faults and other obvious setbacks. Because some virtual I/O operations require read-modify-write I/O operations, there is a window of vulnerability where a fault can cause parity to become inconsistent with the data on the drives. Also, the system I/O requests may require more than one virtual I/O operation to access the same block on the drive. The array implementation must have a method to insure data integrity under these conditions. This software architecture includes a hash table implementation that insures the integrity of the data blocks and parity blocks across the array, during all virtual I/O operations and array error recovery procedures. This includes virtual I/O operations to perform on-line restore, verify, reconfiguration and "hot spare" operations.

To assure data integrity, virtual I/O operations are performed on designated boundaries (i.e., cluster or stripe-width). These boundaries are defined by the array configuration. This architecture uses a hashing implementation based on cluster boundaries to control access to data and parity blocks on the drives during all virtual I/O operations (including error recovery).

A virtual I/O request will access data on one drive in the array (up to one cluster size). A hash table entry is calculated for the cluster associated with the I/O request. If the hash table entry for this I/O request is busy, the driver will wait (sleep) until the entry is freed by the completion of another virtual I/O request through the I/O daemon. The hash table entry is then propagated and retained until the virtual I/O operation is completed by the I/O daemon. If the drive associated with the I/O request is out-of-service, the I/O request structure is initialized (e.g., memory address) and passed directly to the I/O daemon. Otherwise, the I/O request is issued to the underlying device driver.

The parity virtual I/O request is hashed to insure data integrity. If the drive associated with this I/O request is out-of-service, the virtual I/O request is passed directly to the I/O daemon.

The virtual I/O daemon will evaluate its respective queue to determine if there is a virtual I/O request to be processed and wait (sleep) until the virtual I/O done routine puts the next virtual I/O request on the daemon's queue. Note that all virtual I/O requests associated with the same virtual job go to the same daemon queue.

This routine places the completed virtual I/O request on one of the daemon I/O queues and notifies the daemon. The optimal queue is selected based on each daemon's outstanding work load.

The I/O daemon will not start processing the virtual job until all synchronous virtual I/O requests have completed. The daemon does not wait for asynchronous virtual I/O requests.

Implementation

The software array architecture discussed above has been implemented into two software array product manufactured by NCR Corporation titled "Disk Array PLUS" and "Tape Array PLUS". The first releases of NCR Disk Array PLUS and Tape Array PLUS are supported on UNIX based systems. In UNIX, the system I/O request is passed to the software array driver through the read, write, and strategy device driver routines. The UNIX I/O subsystem uses different buffering schemes for processing these system I/O requests. To manage an I/O request from the kernel, the array driver uses a parent-child buffer scheme. This scheme is implemented in many UNIX System V Release 4.0 operating systems. On UNIX systems that do not support this feature, the parent-child scheme is implemented in the array driver itself. The array driver allocates a child buffer to perform a virtual I/O request to the underlying device driver. When a child is allocated the original buffer from the kernel becomes a parent buffer. When all child buffer I/O requests have been completed the original system buffer (parent) is marked completed to the kernel.

To support the asynchronous write feature, the array driver allocates an additional kernel buffer. This buffer points to the additional kernel virtual memory used for all virtual I/O operations which include parity, a read-modify-write, or an out-of-service drive. These virtual I/O operations are performed using child buffers attached to this new buffer. These buffers are referred to as asynchronous child and parent buffers.

The I/O daemon process is spawned through another device driver routine. When the system is booted, the array utility issues an I/O control command to the array drivers I/O control (iocntl) routine. The array driver spawns a tunable number of I/O daemons depending on the number of CPUs supported on the system. Each I/O daemon is assigned a different queue to allow multiple I/O daemons to process virtual jobs in parallel. The I/O daemons will run until the system is shutdown.

Provided below are descriptions of the different virtual I/O operations supported by the NCR Disk Array PLUS and Tape Array PLUS products. To help follow the path of these operations on the provided flow charts, a sequence of reference numerals found on the flow charts is provided for each I/O operation. These reference numerals can be traced on FIGS. 4, 5 and 6. The number found on a conditional branch is only listed if the condition is true (yes). This simplifies the sequence statements. The array configuration used for these examples is a RAID level 5 with three drives.

1. I/O Request Procedure

The following describes the path through the software architecture when all drives are operating during a virtual I/O operation:

1.1 Full Read

When the system buffer requires a full read virtual I/O operation (a read that is equal to the array stripe size), the array driver will issue a child buffer to read all of the data drives. Upon completion of all child buffers, the system buffer will be returned to the kernel with the requested data.

FIG. 3: 300-301-302-305-306-305-306-313

FIG. 4: 318-314-315-325-329-314-315

1.2 Cluster/Partial Read

When the system buffer requires a cluster or partial read (a read that is less than the array stripe size), the array driver will issue a child buffer to read the desired data drive(s). Upon completion of all child buffers, the system buffer will be returned to the kernel with the requested data.

FIG. 3: 300-301-302-305-306-3013

FIG. 4: 325-329-314-315

1.3 Full Write

When the system buffer requires a full write (a write that is equal to the disk or tape array stripe size), the array driver will issue child buffers to write to all data drives. The driver will generate the parity data from the data passed by the kernel and then issue an asynchronous child buffer to write the parity drive. Upon completion of all system child buffers, the system buffer will be returned to the kernel. The asynchronous child buffer may complete some time after the system child buffers.

FIG. 3: 300-301-302-303-304-305-306-305-306-310-311-312-313

FIG. 4: 318-314-315-319-325-326-327-314-315

FIG. 4: 319-325-326-327-328-329-314-315 (async)

1.4 Partial Write

When the system buffer requires a partial write (a write that crosses more than one cluster but is less than the array stripe size), the array driver will issue a child buffer to read the appropriate data drives. Upon completion of all system child buffers, the array driver will issue child buffers to the appropriate data drives to write the data pasted by the kernel. The driver will then generate parity and issue an asynchronous child buffer to the parity drive to write the parity data. Upon completion of all system child buffers, the system buffer will be returned to the kernel. The asynchronous child buffer may complete some time after the system child buffers.

FIG. 4: 319-325-326-327-328-329-314-315 (async)

1.5 Cluster Write

When the system buffer requires a cluster write (a write to one of the data drives in the stripe-width), the array driver will issue a child buffer to read to the appropriate data and parity drives. Upon completion of all child buffers, the current data from the system buffer will be extracted from the parity data, and a child buffer will be issued to write the data drive. The parity data will then be regenerated from the data passed by the kernel. After the parity computation is completed, the parity child buffer will be marked as asynchronous and issued to write the parity drive. When the system child buffers complete, the system buffer will be returned to the kernel. The asynchronous child buffer may complete some time after the system child buffers.

FIG. 4: 319-325-326-327-328-329-314-315 (async)

Note: if the write-back tunable is set both child buffers writing will be asynchronous. The I/O daemon sequence would change as shown:

FIG. 3: 300-301-302-303-304-305-306-309-310-312-313

FIG. 4: 319-325-326-327-314-315 (async)

FIG. 4: 319-325-326-327-328-329-314-315 (async)

2. I/O Request Procedure With Drive Failure

The following describes the path through the software architecture when a drive fails during a virtual I/O operation:

2.1 Full Read

When a read child buffer fails during a full read virtual I/O operation, the I/O daemon will issue a child buffer to read the parity drive. Upon completion of the read requests, the data for the failed drive is recreated, the failed drive is marked out-of-service and the system buffer is returned to the kernel with the requested data.

2.2 Cluster/Partial Read

When a read child buffer fails during a partial read virtual I/O operation, the I/O daemon will issue one or more child buffers to read all data drives that do not currently have their data in memory along with the parity drive. Upon completion of all read requests, the data for the failed drive is recreated, the failed drive is marked out-of-service and the system buffer is returned to the kernel with the requested data.

FIG. 3: 300-301-302-305-306-313
FIG. 5: 338-339-314-315-338-340-314-315-338-341-314-315
FIG. 5: 332-333-336-337-319-325
FIG. 4: 314-315-326-327-328-329-314-315

2.3 Full Write

When a write child buffer fails (data or parity) during a full write virtual I/O operation, The I/O daemon will retry the write request once, if the retry fails the drive is marked out-of-service.

FIG. 3: 300-301-302-303-304-305-306-305-306-309-310-311-312-313
FIG. 5: 318-314-315-330-331-314-315
FIG. 5: 332-333-336-337-319-325-326-327
FIG. 4: 314-315-326-327-328-329-314-315 (async)

Note: if the error occurred on the write of parity the I/O daemon sequence would change as shown:

FIG. 5: 318-314-315-325-326-327-314-315-330-331-314-315
FIG. 5: 332-333-326-327-328-329-314-315

2.4 Partial Write

When a read child buffer fails during a partial write virtual I/O operation (read-modify-write operation), the array driver will issue one or more child buffers to read all other data drives. Upon completion of the read requests, the data for the failed drive is recreated, the new parity data is generated and the array driver will issue one or more child buffers to write the data passed by the kernel to the appropriate data drives. If the data drive can not be re-written it will be marked out-of-service. Upon completion of the parity generation, the array driver will issue a child buffer to write the parity data to the parity drive. When the system child buffers complete, the system I/O request is returned to the kernel.

FIG. 3: 300-301-302-303-304-305-306-307-308-313
FIG. 5: 318-314-315-338-339-314-315-338-341-314-315
FIG. 5: 332-333-322-323-314-315-318-314-315-319-325
FIG. 4: 326-327-314-315-319-325-326-327-328-329-314-315

Note: If the I/O error occurs on the write part of this read-modify-write operation to any drive the error is retied once the same as a full write error described above.

2.5 Cluster Write

When a read child buffer fails during a cluster write virtual I/O operation (read-modify-write operation), the array driver will issue child buffers to read all other data drives. Upon completion of the read requests, the data for the failed drive is recreated and new parity data is generated. Upon completion of the parity generation, the array driver will issue a child buffer to write the data and parity drive. If the data drive can not be re-written it will be marked out-of-service and when the parity write completes, the system buffer is returned to the kernel.

FIG. 3: 300-301-302-303-304-305-306-309-310-312-313
FIG. 5: 318-314-315-338-339-340-314-315-338-341-314-315
FIG. 5: 332-333-322-323-314-315-318-314-315
FIG. 4: 319-325-326-327-314-315
FIG. 4: 319-325-326-327-328-329-314-315

Note: If the I/O error occurs on the write part of the read-modify-write operation to any drive the error is retied once the same as a full write error described above.

3. I/O Request Procedure With Drive Out-Of-Service

If the parity drive on a RAID 4 is the out-of-service drive, the array driver will simply perform all I/O requests to the data drives. In this mode of operation the configuration is treated as a RAID level 0 array.

The following describes the path through the software architecture when a data drive is out-of-service during a virtual I/O operation:

3.1 Full Read

When the system buffer requires a full read virtual I/O operation, the array driver will issue child buffers to read all active data drives and the parity drive. Upon completion of all read requests, the data for the out-of-service data drive is recreated and the system buffer is returned to the kernel with the requested data.

FIG. 3: 300-301-302-305-306-305-306-309-310-312-313
FIG. 5: 318-314-315-336-337-325-326-327-328-329-314-315

3.2 Cluster/Partial Read

When the system buffer requires a partial/cluster read virtual I/O operation, the array driver will issue child buffers to read all active data drives and the parity drive. Upon completion of all read requests, the data for the out-of-service data drive is recreated and the system buffer is returned to the kernel with the requested data.

FIG. 3: 300-301-302-305-306-307-308-309-310-312-313
FIG. 5: 318-314-315-336-337-325-326-327-328-329-314-315

3.3 Full Write

When the system buffer requires a full write virtual I/O operation, the array driver issues child buffers to write to all active data drives, if parity is active, the driver will then generate the parity data from the data passed from the kernel and issue a child buffer to write the parity drive. Upon completion of all write requests, the system buffer is returned to the kernel.

FIG. 3: 300-301-302-303-304-305-306-305-306-309-310-311-312-313
FIG. 4: 318-314-315-319-325-326-328-329-314-315

3.4 Partial Write

When the system buffer requires a partial write virtual I/O operation, the array driver will issue child buffers to read the other active data drives and the parity drive. Upon completion of all read requests, the data for the out-of-service drive will be recreated. Then the parity data can be regenerated from all of the given data and the array driver will issue child buffers to write the appropriate active data drives and the parity drive. Upon completion of all write requests, the system buffer is returned to the kernel.

FIG. 3: 300-301-302-303-304-305-306-307-308-309-310-312-313
FIG. 5: 318-314-315-336-337-322-323-314-315
FIG. 5: 318-314-315-319-325-326-327-328-329-314-315

Note: On a RAID 5, if parity is the original drive out-of-service in the stripe-width at the start of this virtual I/O operation, the data is just written to the data drives.

3.5 Cluster Write

When the system buffer requires a cluster write virtual I/O operation, the array driver converts the piece write to a partial write and handles it in the same manner as a partial write to an out-of-service drive.

Note: On a RAID 5, if parity is the original drive out-of-service in the stripe-width at the start of this virtual I/O operation, the data is just written to the data drives.

4. Automatic Error Recovery

The virtual I/O daemon error recovery procedure provides a means of recreating lost data due to an I/O error during any virtual I/O operation (e.g., data transfers, restore, verify, reconfiguration, etc.). If the underlying driver supports automatic bad block handling, this procedure will eliminate the need to take a drive out-of-service due to any medium error on a drive.

When a child buffer fails due to an I/O error, the I/O daemon suspends its work queue until error recovery is completed. The I/O daemon will only processes child buffers that are associated with the virtual job during the error recovery procedure. All other child buffers performing I/O to the same array configuration from a different virtual job are placed on an alternate daemon queue. When the error recovery is completed (pass/fail) the child buffers on the alternate queue are placed on the daemon's work queue and the work queue is resumed.

4.1 Write Error

When a write child buffer completes with an I/O error during a virtual I/O operation, the I/O daemon will re-issue the synchronous child buffer to write the drive. If the underlying driver has mapped the bad block, the I/O request will complete without error. The I/O daemon will proceed to process the virtual I/O operation. The following is an example of the flow chart sequence for a full write virtual I/O operation:

FIG. 4: 314-315-326-327-328-329-314-315 (async)

4.2 Read Error

When a read child buffer completes with an I/O error during a virtual I/O operation, the I/O daemon will issue one or more synchronous child buffers to read all drives (including parity) that do not currently have their data in memory.

Upon completion of all read requests, the I/O daemon will recreate the unrecoverable read data. This recreate operation can only be attempted if parity is not out-of-date and there are no out-of-service drives, otherwise, the array will be taken off-line (no I/O activity will be allowed). Once the data is re-created, the I/O daemon will issue a synchronous child buffer to write the data to the failed drive. If the underlying driver has mapped the bad block, the I/O request will complete without error. The I/O daemon will proceed to process the virtual I/O operation. The following is an example of the flow chart sequence for a full read virtual I/O operation:

It can thus be seen that there has been provided by the present invention an array storage system architecture which is scalable and tunable for use within uni-processor and multi-processor computer systems. The architecture includes several modules, the operation of which can be distributed among processors within a multiple processor computer system to process the various steps within one or more I/O operations in parallel.

As stated earlier, one of the performance penalties of current RAID implementations is the performance degradation on writes to multiple drives. This architecture is asynchronous by design and has eliminated this degradation making the redundant or parity drives virtually transparent. Redundant mirror drive write operations (RAID 1) or parity write operations (RAID 4 and 5) may be performed independently of, and not contemporaneous with primary data write operations This architecture is scalable by design and allows data recreation and parity generation to be distributed across more than one processor.

There are other advantages to this software architecture. This architecture is not limited to disk arrays. It can be used to provide RAID technology on sequential access devices (e.g. Qic tapes, DAT tapes, etc.) as well as other direct access devices (e.g., optical disks and media changers) and robotic media changer storage devices. (e.g.: robotic arm devices, (carousels, stackers or juke boxes). This architecture is also not limited to UNIX platforms. It can be ported to several other non-UNIX platforms (e.g., Novell).

Although the presently preferred embodiment of the invention has been described, it will be understood that various changes may be made within the scope of the appended claims.

What is claimed is:

1. An array storage system, comprising:

a plurality of drives for storing data;

a physical device driver corresponding to each one of said plurality of drives;

a software array driver module for receiving a system I/O request and translating said system I/O request into one or more virtual I/O requests, said virtual I/O request being provided to one or more of said physical device drivers;

each one of said physical device drivers receiving a virtual I/O request operating to translate said received I/O request into a physical I/O request, said physical I/O request being provided to said drive corresponding to said one of said physical device drivers;

a separate call-back module, different from said physical device drivers, for receiving physical I/O complete signals from said plurality of drives and translating said physical I/O complete signals into one or more virtual I/O complete signals corresponding to said one or more virtual I/O requests; and a separate virtual I/O daemon module, different from said software array driver module, for receiving said one or more virtual I/O complete signals from said call-back module and translating said received virtual I/O complete signals into a system I/O complete signal;

wherein said one or more virtual I/O complete signals are communicated to said virtual I/O daemon module independently of said physical device drivers and said software array driver module.

2. The array storage system according to claim 1, wherein:

said plurality of drives includes at least one drive for storing parity information; and virtual I/O requests directed to said parity drive are executed independently of virtual I/O requests directed to said data drives.

3. The array storage system according to claim 1, wherein:

said plurality of drives includes at least one drive for storing parity information; and said virtual I/O daemon module generates said system I/O complete signal prior to receipt of virtual I/O complete signals corresponding to said virtual I/O requests directed to said parity drive.

4. The array storage system according to claim 1, wherein:

said virtual I/O daemon module monitors the operational status of said drives and generates additional virtual I/O requests necessary to recreate data residing on a failed drive in response to a read I/O request, said additional virtual I/O requests being provided to said device driver.

5. The array system according to claim 4, wherein:

said software array driver module and said virtual I/O daemon module include a hash table implementation to insure the integrity of data and parity during virtual I/O operations and array error recovery procedures.

6. The array system according to claim 5, wherein:

each one of said virtual I/O requests accesses up to one cluster of data on one drive in said plurality of drives; and said hash table implementation determines a hash table entry for said cluster.

7. The array system according to claim 1, wherein:

said array storage system is configured in accordance with RAID level 5; and said virtual I/O daemon module generates additional virtual I/O requests necessary to generate parity information in response to a write I/O request, said additional virtual I/O requests being provided to said device driver.

8. The array system according to claim 7, wherein:

said virtual I/O daemon module generates said system I/O complete signal prior to receipt of virtual I/O complete signals corresponding to said additional virtual I/O requests necessary to generate parity information.

9. The array system according to claim 7, wherein:

said software array driver module and said virtual I/O daemon module include a hash table implementation to insure the integrity of data and parity during virtual I/O operations.

10. The array system according to claim 9, wherein:

each one of said virtual I/O requests accesses up to one cluster of data on one drive in said plurality of drives; and said hash table implementation determines a hash table entry for said cluster.

11. The array storage system according to claim 1, wherein:

said array storage system includes a plurality of virtual I/O daemon modules capable of processing virtual jobs in parallel.

12. The array storage system according to claim 1, wherein:

said array storage system is included within a multiprocessor computer system; and said array storage system includes a tunable number of virtual I/O daemon modules depending on the number of CPUs supported on the multiprocessor computer system, said virtual I/O daemon modules being capable of processing virtual jobs in parallel.

13. The data storage system according to claim 1, wherein:

said plurality of data storage devices comprises a plurality of disk drives.

14. The data storage system according to claim 1, wherein:

said plurality of data storage devices comprises a plurality of robotic media changer storage devices.

15. The data storage system according to claim 1, wherein:

said plurality of data storage devices comprises a plurality of tape storage devices.

16. In a multiple processor data processing system that includes an I/O subsystem, a data storage system comprising:

a plurality of disk drives;

a physical device driver corresponding to each one of said plurality of disk drives;

a software array driver module for receiving a system I/O request from the I/O subsystem and translating said system I/O request to one or more virtual I/O requests, said one or more virtual I/O requests being provided to one or more of said physical device drivers;

each one of said physical device drivers receiving a virtual I/O request operating to translate said received virtual I/O request into a physical I/O request, said physical I/O request being provided to said disk drive corresponding to said one of said physical device drivers; and a plurality of virtual I/O daemon modules for communicating with said physical device drivers and said software array driver module wherein:

said software array driver module and said plurality of virtual I/O daemon modules being operative with each of a selected one of a plurality of data storage configurations defined in a group that includes a number of RAID levels;.

at least one or said virtual I/O daemon modules generating parity, associated with data storage, in parallel with a virtual I/O request from the I/O subsystem that is being processed using said software array driver module;

at least one of said plurality of virtual I/O daemon modules operating in parallel to a first virtual I/O request being processed by said software array driver module to determine an occurrence of an error related to said first virtual I/O request and for processing an error recovery procedure based on the determined error.

17. The data storage system according to claim 16, wherein:

said plurality of virtual I/O daemon modules comprises a tunable number of virtual I/O daemons depending on the number of CPUs supported on the multiple processor data processing system.

18. The data storage system according to claim 16, wherein:

said multiple processor data processing system employs a UNIX operating system; and said software array driver receives said system I/O request from a UNIX kernal I/O subsystem.

19. A data storage system comprising:

a plurality of data storage devices;

a physical device driver corresponding to each one of said data storage devices;

a software array driver module for receiving a system I/O request and translating said system I/O request into one or more virtual I/O requests, said virtual I/O request being provided to one or more of said physical device drivers;

each one of said physical device drivers receiving a virtual I/O request operating to translate said received virtual I/O request into a physical I/O request, said physical I/O request being provided to said disk drive corresponding to said one of said physical device drivers;

a separate call-back module, different from said physical device drivers, for receiving physical I/O complete signals from said plurality of disk drives and translating said physical I/O complete signals into one or more virtual I/O complete signals corresponding to said one or more virtual I/O requests; and a separate virtual I/O daemon module., different from said software array driver module, for receiving said one or more virtual I/O complete signals from said call-back module and translating said received virtual I/O complete signals into a system I/O complete signal;

wherein said one or more virtual I/O complete signals are communicated to said virtual I/O daemon module independently of said physical device drivers and said software array driver module.

20. The data storage system according to claim 19, wherein:

said plurality of data storage devices comprises a plurality of disk drives.

21. The data storage system according to claim 19, wherein:

said plurality of data storage devices comprises a plurality of robotic media changer storage devices.

22. The data storage system according to claim 19, wherein:

said plurality of data storage devices comprises a plurality of tape storage devices.

* * * * *